(12) United States Patent
Ditnes et al.

(10) Patent No.: US 9,687,036 B2
(45) Date of Patent: Jun. 27, 2017

(54) DRESS CLIP

(71) Applicants: Russell Ditnes, Jamison, PA (US);
Jesse Ditnes, Huntingdon Valley, PA (US)

(72) Inventors: Russell Ditnes, Jamison, PA (US);
Jesse Ditnes, Huntingdon Valley, PA (US)

( * ) Notice: Subject to any disclaimer, the term of this patent is extended or adjusted under 35 U.S.C. 154(b) by 16 days.

(21) Appl. No.: 14/718,739

(22) Filed: May 21, 2015

(65) Prior Publication Data

US 2015/0335084 A1  Nov. 26, 2015

Related U.S. Application Data

(60) Provisional application No. 62/001,364, filed on May 21, 2014.

(51) Int. Cl.
| | | |
|---|---|---|
| *A41F 19/00* | (2006.01) | |
| *F16B 2/10* | (2006.01) | |
| *A41F 17/02* | (2006.01) | |

(52) U.S. Cl.
CPC .............. *A41F 19/00* (2013.01); *A41F 17/02* (2013.01); *F16B 2/10* (2013.01); *Y10T 24/3439* (2015.01); *Y10T 24/3443* (2015.01); *Y10T 24/4447* (2015.01); *Y10T 24/44444* (2015.01); *Y10T 24/44453* (2015.01)

(58) Field of Classification Search
CPC ......... Y10T 24/44385; Y10T 24/44402; Y10T 24/3439; Y10T 24/3443; Y10T 24/4447; A41F 9/00; F16B 2/10
See application file for complete search history.

(56) References Cited

U.S. PATENT DOCUMENTS

| | | | |
|---|---|---|---|
| 56,341 A | 7/1866 | Phelps | |
| 57,950 A | 9/1866 | Moody | |
| 266,948 A * | 10/1882 | Anderson | D06F 55/00 |
| | | | 24/510 |
| 473,232 A | 4/1892 | Long | |
| 478,423 A * | 7/1892 | Schaffner | A63H 3/18 |
| | | | 446/359 |
| 497,516 A | 5/1893 | Brewer et al. | |
| 631,877 A * | 8/1899 | Odson | D06F 55/00 |
| | | | 24/332 |
| 726,830 A | 4/1903 | Wheelock | |
| 891,739 A | 6/1908 | Schwotzer | |
| 1,402,378 A * | 1/1922 | Reinhardt | A41F 11/02 |
| | | | 24/516 |
| 1,745,553 A | 2/1930 | Mitmann | |
| 1,992,023 A * | 2/1935 | Cahn | A45D 2/42 |
| | | | 24/507 |

(Continued)

FOREIGN PATENT DOCUMENTS

EP      1585398 B1      5/2012

*Primary Examiner* — Robert J Sandy
(74) *Attorney, Agent, or Firm* — Barley Snyder

(57) ABSTRACT

A dress clip is provided and includes a first clip and a second clip. The first clip includes having a first fastener body, a second fastener body, and a first attachment mechanism connecting the first fastener body and the second fastener body. The second clip includes the second fastener body, a third fastener body positioned oriented opposite the second fastener body, and a second attachment mechanism connecting the second fastener body and third fastener body.

14 Claims, 12 Drawing Sheets

(56) References Cited

U.S. PATENT DOCUMENTS

| | | | |
|---|---|---|---|
| 3,064,268 A | 11/1962 | Nania, Jr. | |
| 5,630,231 A | 5/1997 | Stevens | |
| 5,863,021 A * | 1/1999 | Nichols | B25B 7/00 24/332 |
| 6,101,689 A * | 8/2000 | Jo | A45F 5/02 24/332 |

* cited by examiner

DRESS CLIP

CROSS-REFERENCE TO RELATED APPLICATIONS

This application is a non-provisional application converted from and claiming the benefit of the filing date under 35 U.S.C. §119(e) of Provisional Patent Application No. 62/001,364, filed May 21, 2014.

FIELD OF THE INVENTION

The invention is generally related to a clip and, more specifically, to a dress clip.

BACKGROUND

Generally, a garment may be obstructive to a person during voiding and/or defecation, especially when the garment is a dress or skirt. The dress or skirt may come into contact with human waste and then become soiled. Also, the dress or skirt may come into contact with bacteria and/or viruses common in the surrounding areas, since the garment freely moves and may touch contaminated surfaces.

In other situations, it can be difficult for a caregiver to change a disposable underwear for urinary or fecal incontinence when the garment is in the way. Not only may the garment impede the care giver's vision, but the garment may be soiled or contaminated by human waste, bacteria or viruses.

Accordingly, there is a long felt need for a device that provides a garment wearer or caregiver an ability to restrain free movement extremities of the garment.

SUMMARY

It is therefore an object of the invention to disclose a dress clip having a first clip having a first fastener body, a second fastener body, and a first attachment mechanism connecting the first fastener body and the second fastener body, and a second clip having the second fastener body, a third fastener body positioned oriented opposite the second fastener body, and a second attachment mechanism connecting the second fastener body and third fastener body.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
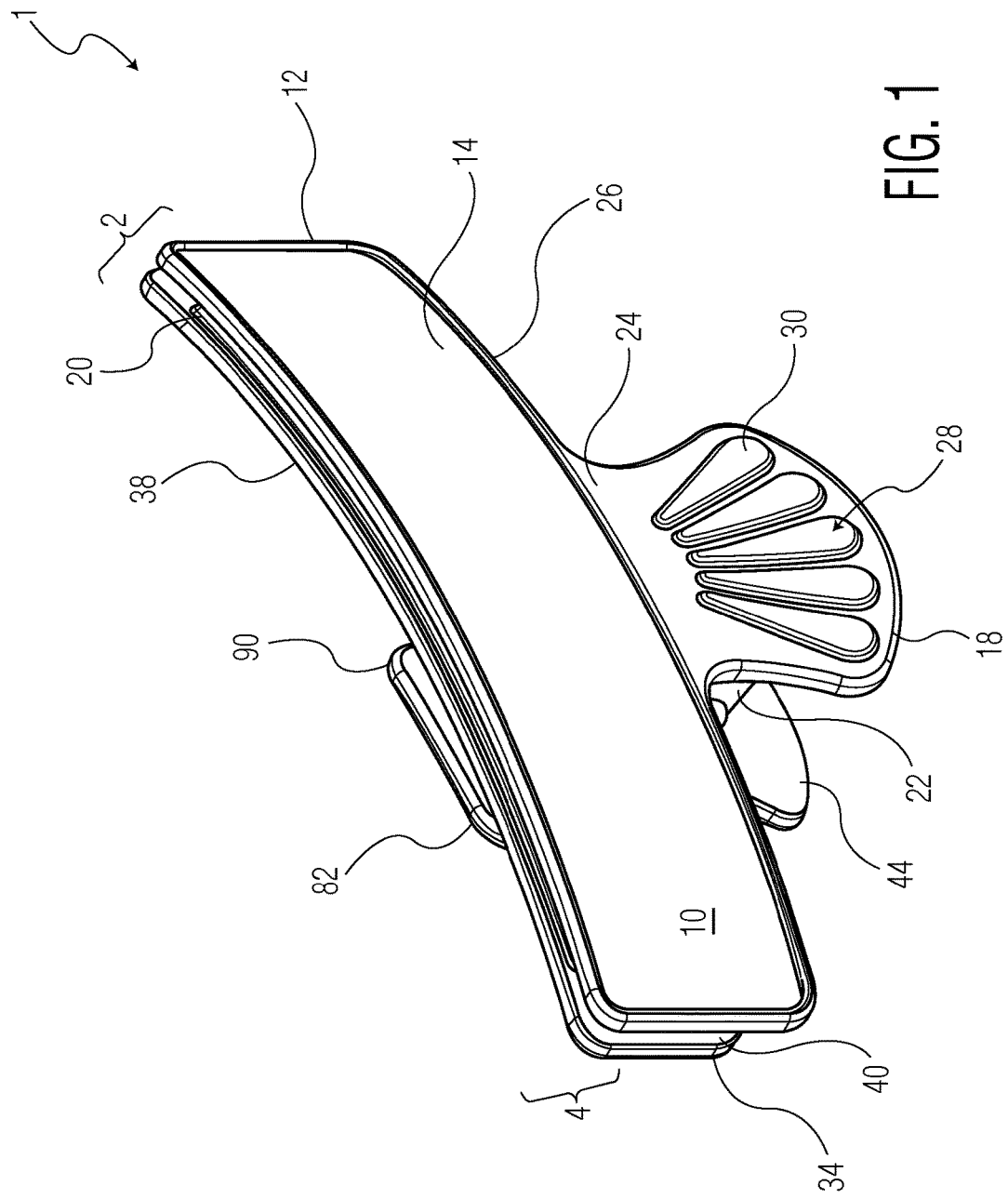
FIG. 1 is a perspective view of a dress clip according to the invention.

Now with respect to FIGS. 1-6, a dress clip 1 according to the invention is shown with the following major components: a first clip 2 and a second clip 4.

The first clip 2 includes a first fastener body 10, a second fastener body 34, and a first attachment mechanism 66. The second clip 4 includes the second fastener body 34, a third fastener body 82, and a second attachment mechanism 106.

Figure 2:
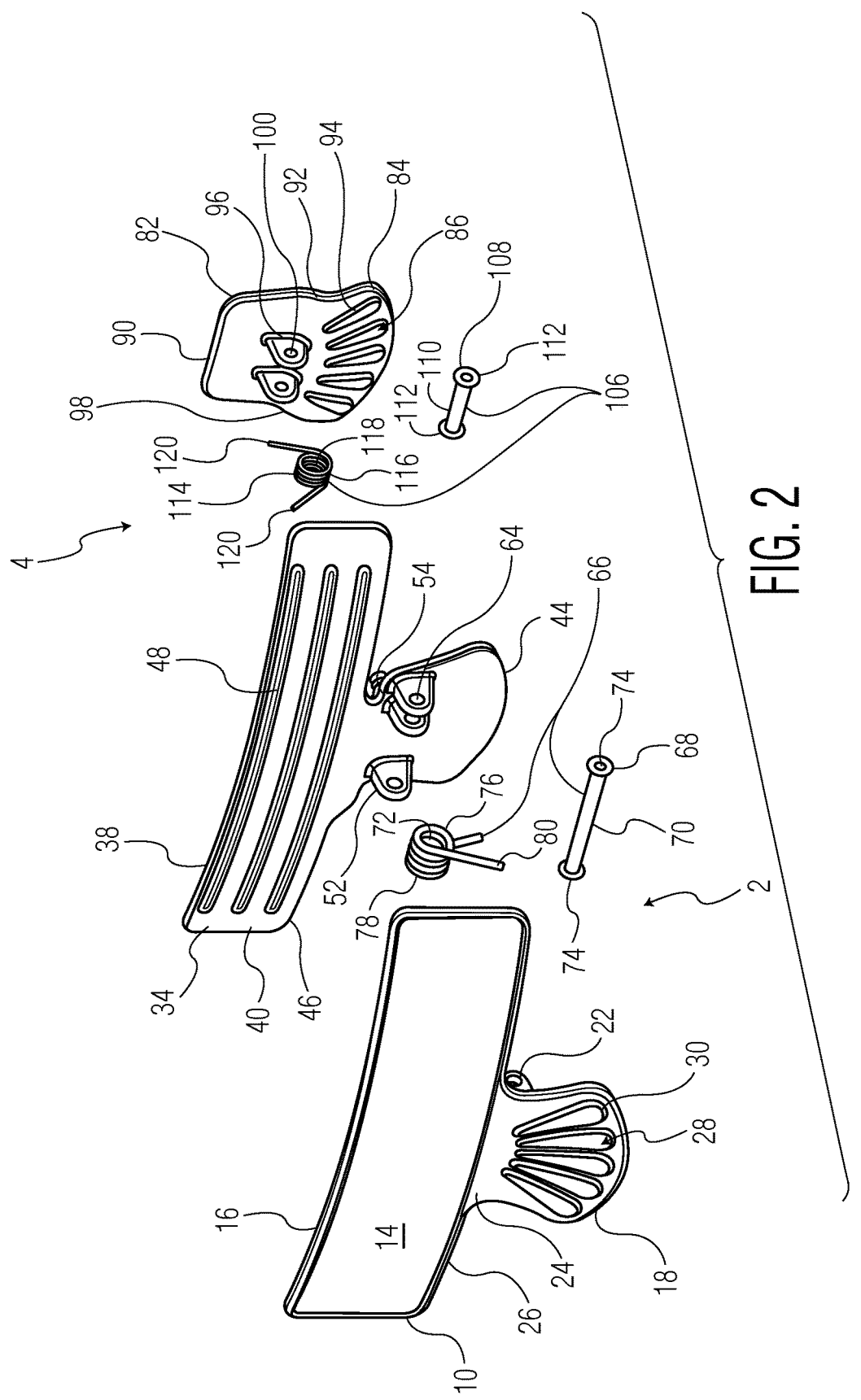
FIG. 2 is an exploded view of the dress clip of FIG. 1.
Figure 3:
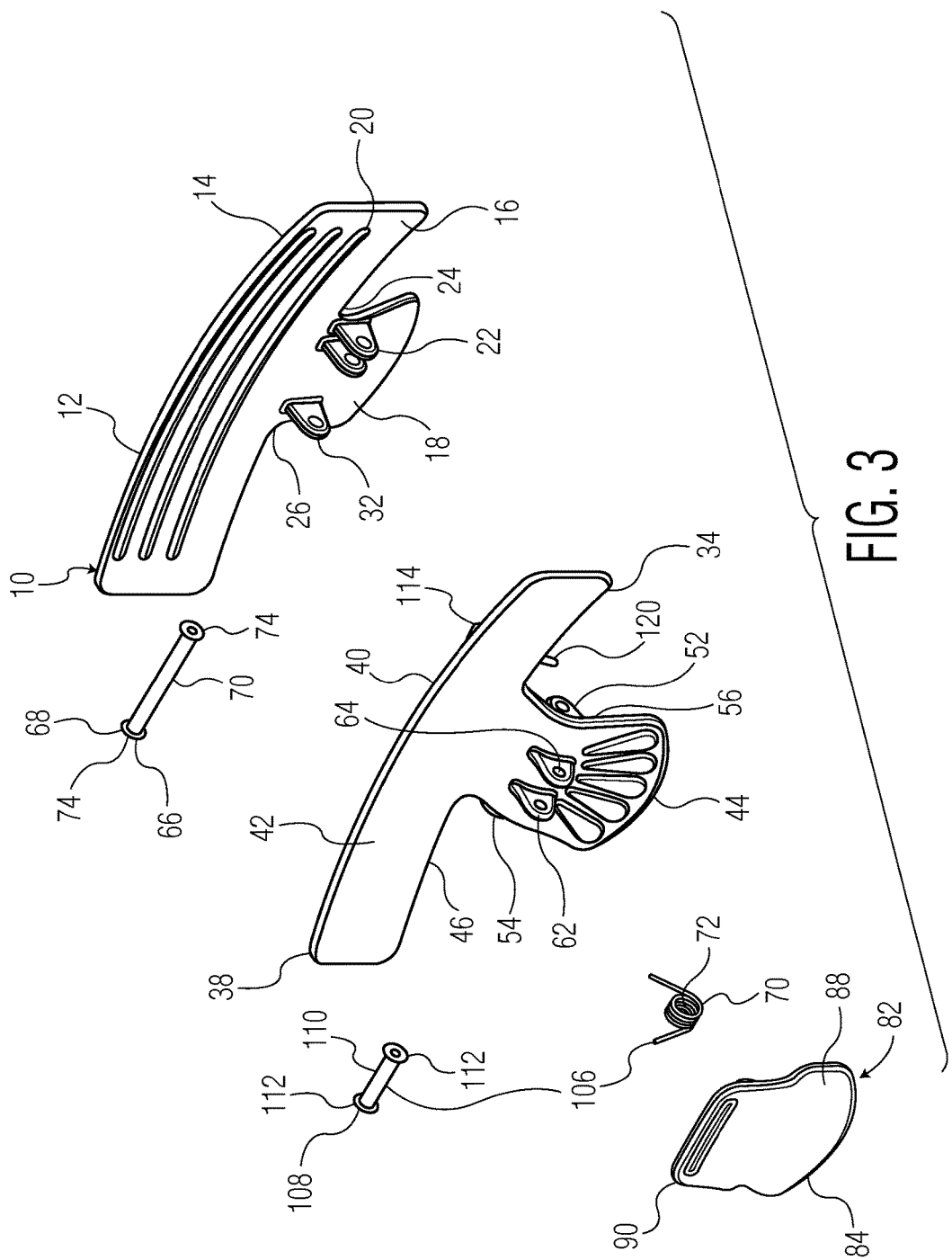
FIG. 3 is an exploded view of the dress clip of FIG. 1.
Figure 4:
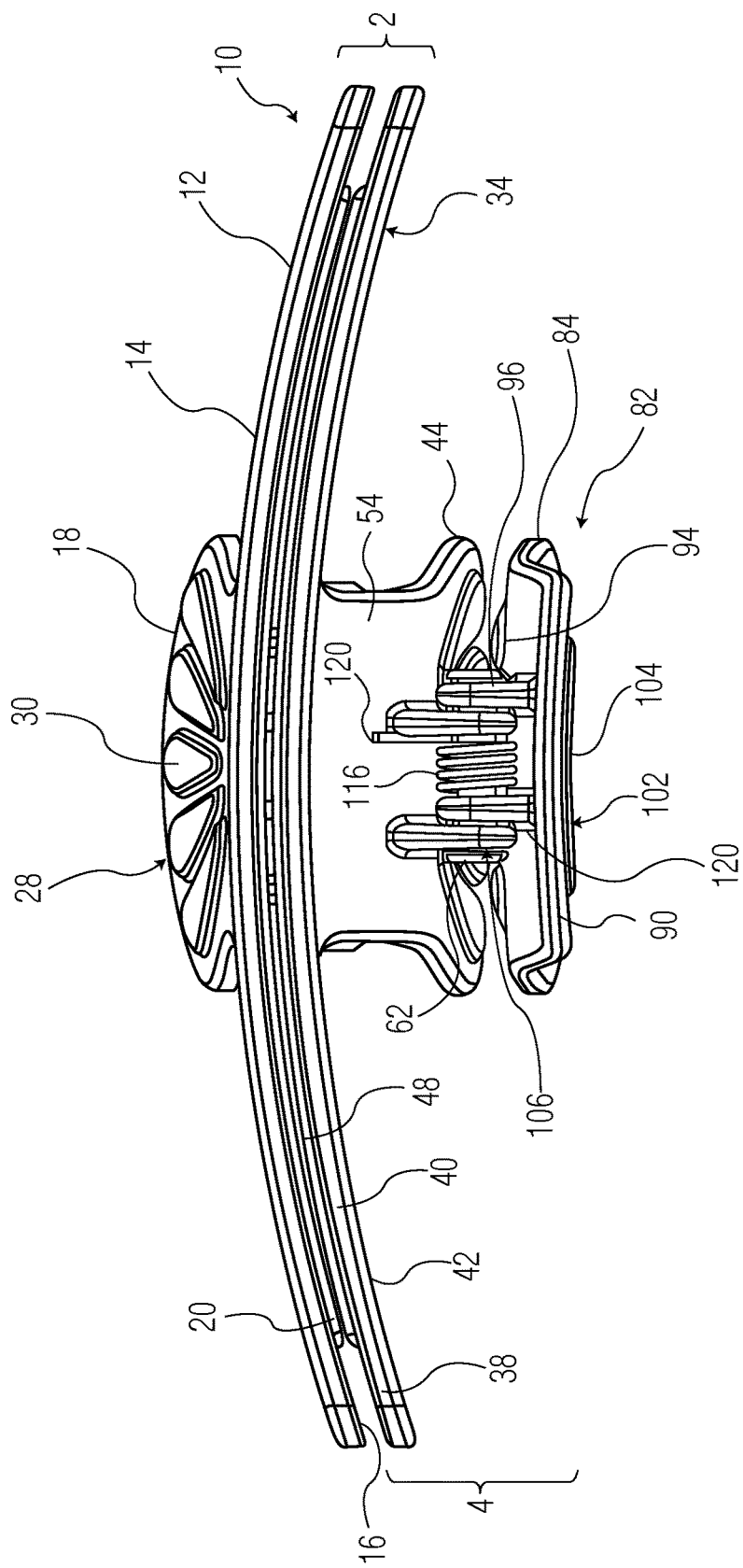
FIG. 4 is a top view of the dress clip of FIG. 1.
Figure 5:
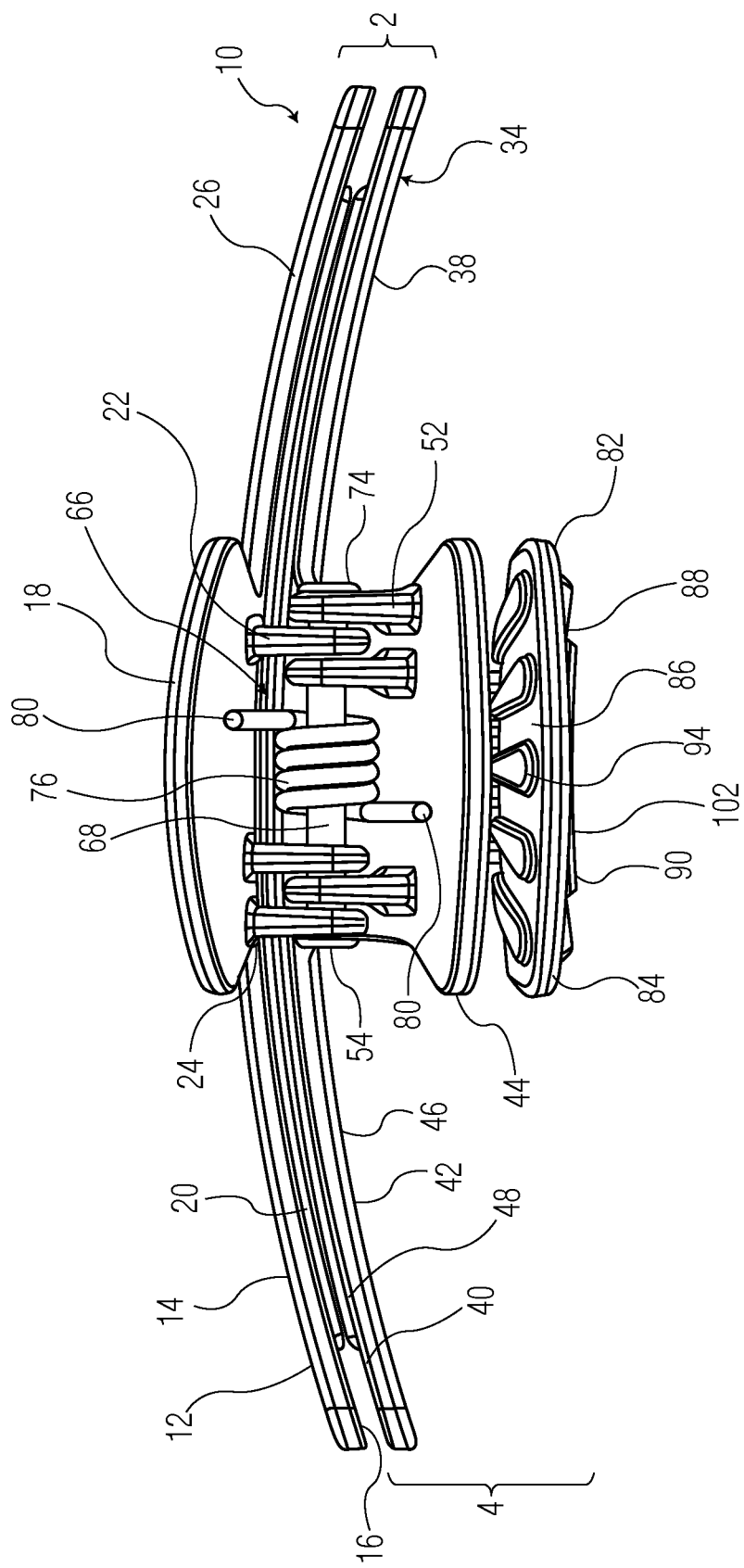
FIG. 5 is a bottom view of the dress clip of FIG. 1.
Figure 6:
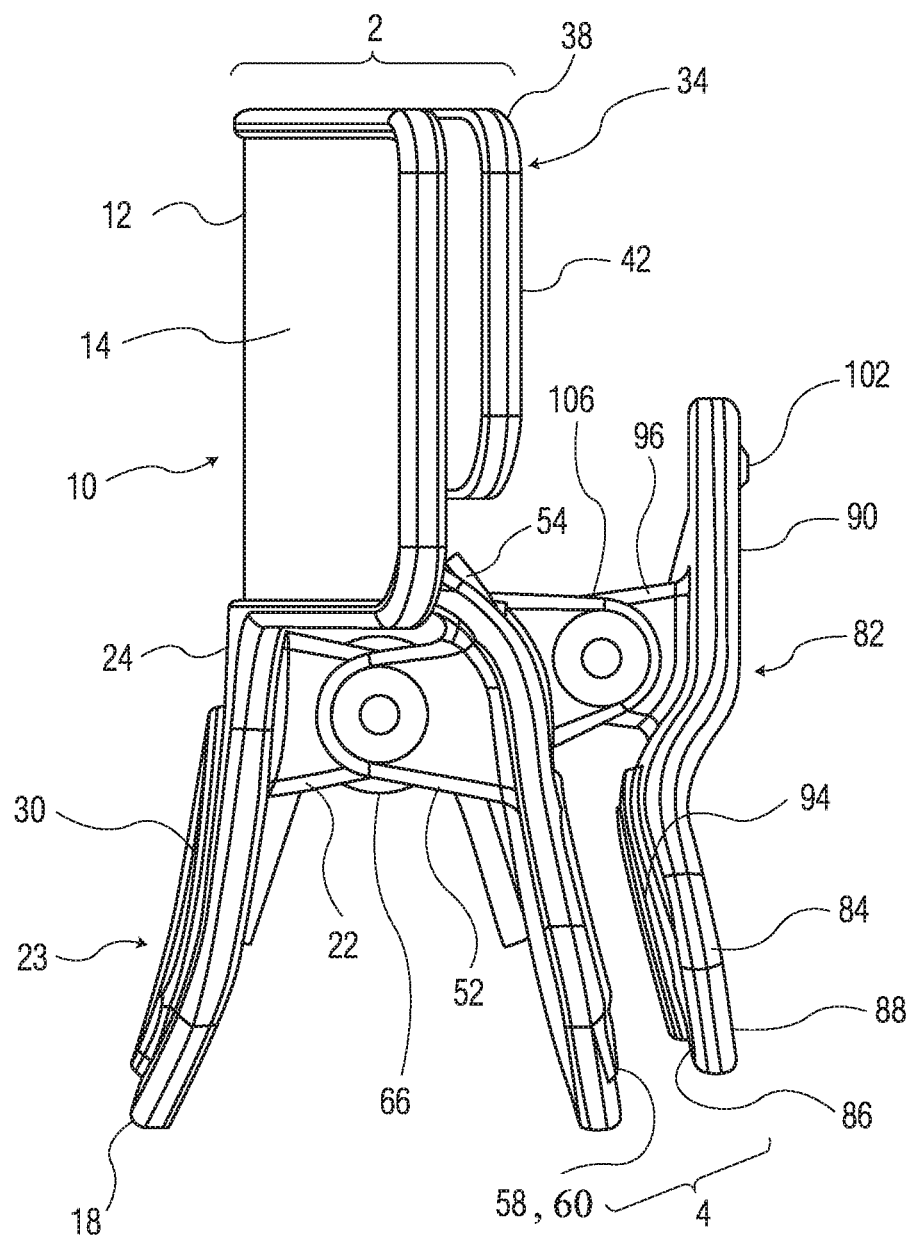
FIG. 6 is a side view of the dress clip of FIG. 1.
Figure 7:
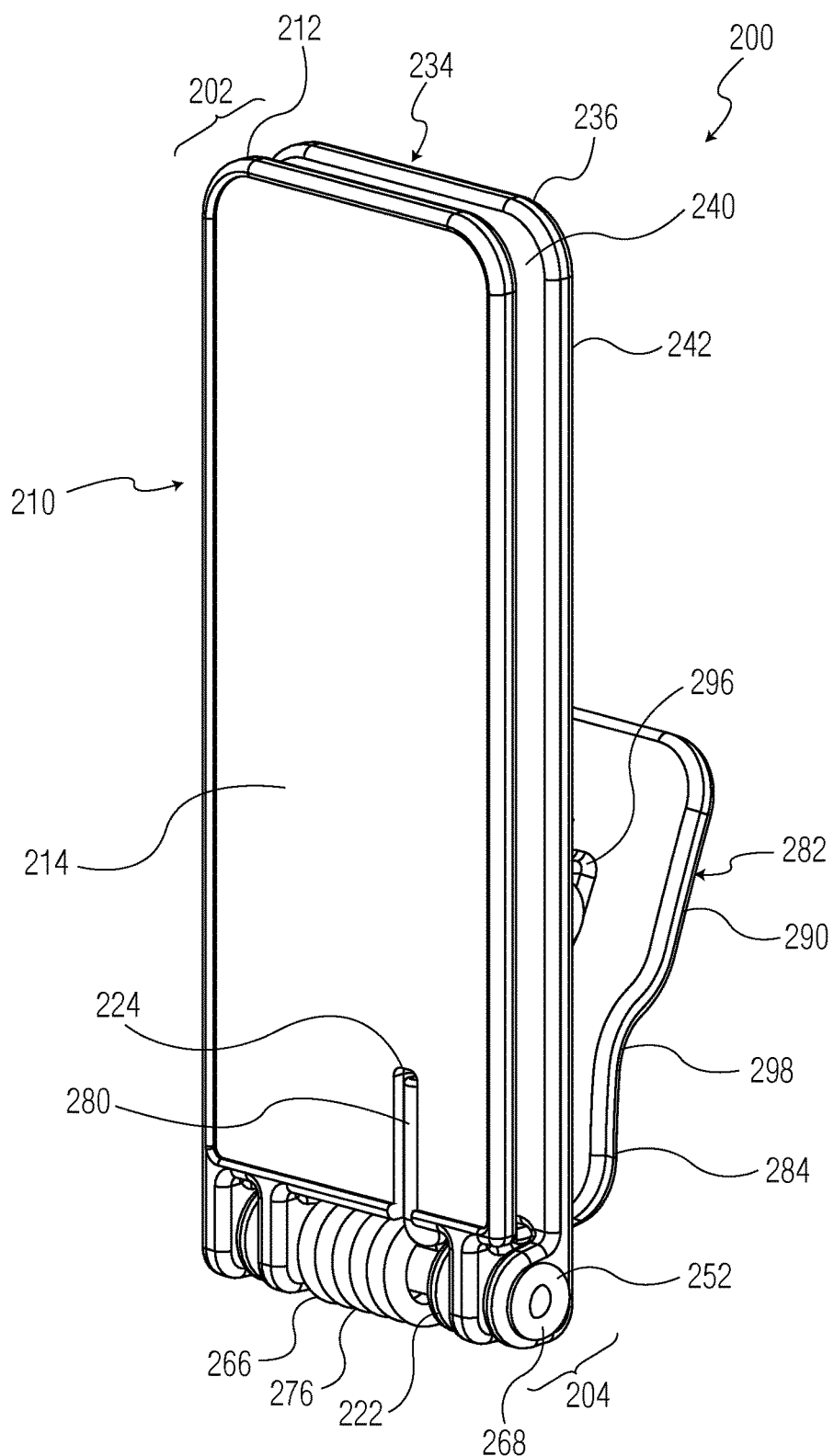
FIG. 7 is a perspective view of another dress clip according to the invention.

As shown in FIGS. 1-3, the first fastener body 10 includes a first grip body 12 with a first outer surface 14 and a first grip surface 16 opposite the first outer surface 14, a first actuation body 18, a plurality of fasteners 20, and a plurality of first attachment tabs 22.

The first fastener body 10 can be made of a plastic, a metal, other material known to one skilled in that art, or a combination of materials thereof.

As shown in FIGS. 1-3, the first grip body 12 is substantially rectangular planar member, although other polygonal shapes, such as a square, triangle, or circle, may also be used. The first grip body 12 is solid, but could also be hollow or include one or more perforations extending there through. As more clearly shown in FIG. 4, the first grip body 12 is curved such that the first outer surface 14 is convex and the first grip surface 16 is concave. Accordingly, the shown first grip body 12 has a negative meniscus shape. However, one skilled in the art should appreciate that the first grip body 12 could have known shapes, such as biconvex, plano convex, positive meniscus, plano concave, or bio concave. In the shown embodiment, the first grip body 12 is curved with respect to a horizontal plane extending through the dress clip 1. In another embodiment, it is possible that the first body is a flat planar member not having any curve to its shape.

As shown in FIGS. 2-6, the plurality of fasteners 20 are disposed along the first grip surface 16. In an exemplary embodiment, each fastener 20 is an elongated protuberance extending horizontally to opposite ends of the first grip body 12. One skilled in the art should appreciate that other designs are possible, including, but not limited to a tack material, a hook and loop fastener, magnet, or protruding member that is applied thereof to provide added friction.

As shown in FIGS. 1-6, the first actuation body 18 extends away from an edge surface of the first grip body 12, about an approximate middle portion thereof. However, one skilled in the art should appreciate that the first actuation body 18 may be disposed at various positions along first grip body 12. In an exemplary embodiment, the first actuation body 18 extends away from a bottom surface edge 26 at an angle, away from the second surface The first actuation body 18 may also include a grip 28 for accommodating a firm grasp by a user. As shown, the grip may include a plurality of protrusions 30 from the first actuation body 18 surface. Once skilled in the art should appreciate that other designs are possible, including, but not limited to tack material, physical depressions, or mechanically attached pieces.

As shown in FIGS. 1-3, the first attachment tabs 22 are disposed on an inner surface of the first actuation body 18. Also, as shown, the first attachment tabs 22 are positioned proximate to a connection section 24 between the first actuation body 18 and the first grip body 12. As clearly shown in FIG. 3, the first attachment tabs 22 includes three first attachment tabs 22, with a pair of first attachment tabs 22 positioned on one side of the first actuation body 18, and another first attachment tab 22 positioned on an opposing other side of the first actuation body 18. The distance between the pair of first attachment tabs 22 is made less than the distance between the other first attachment tab 22 and the closer first attachment tab 22 of the pair of first attachment tabs 22. In the shown embodiment, the distance between the pair of first attachment tabs 22 is slight larger than a thickness of the first attachment tabs 22. One skilled in the art should appreciate that other designs are possible. For instance, it is possible that the first fastener body 10 includes more or less first attachment tabs 22 than shown.

As shown, each first attachment tab 22 includes a pin receiving passageway 32 positioned on an end portion distal thereof, in the exemplary embodiment.

As shown in FIGS. 1-3, the second fastener body 34 includes a second grip body 38 with a second grip surface 40 and a second outer surface 42 opposite the second grip surface 40, a second actuation body 44, a plurality of fasteners 48, a plurality of second attachment tabs 52, and a plurality of third attachment tabs 62.

The second fastener body 34 can be made of a plastic, a metal, other material known to one skilled in that art, or a combination of materials thereof.

As shown in FIGS. 1-3, the second grip body 38 is a substantially rectangular planar member, although other polygonal shapes, such as a square, triangle, or circle, may also be used. The second grip body 38 is solid, but could also be hollow or include one or more perforations extending there through. As more clearly shown in FIG. 4, the second grip body 38 is curved such that the second outer surface 42 is convex and the second grip surface 40 is concave. Accordingly, the shown second grip body 38 also has a negative meniscus shape, like that of the first grip body 12. Accordingly, the first grip body 12 and the second grip body 38 are shaped to complement each other. However, one skilled in the art should appreciate that the second grip body 38 could have known shapes, such as biconvex, plano convex, positive meniscus, plano concave, or bio concave. In the shown embodiment, the second grip body 38 is curved with respect to a horizontal plane extending through the dress clip 1. In another embodiment, it is possible that the first body is a flat planar member not having any curve to its shape.

As shown in FIGS. 2-6, the plurality of fasteners 48 are disposed along the second grip surface 40. In an exemplary embodiment, each fastener 48 is an elongated protuberance extending horizontally to opposite ends of the second grip body 38. One skilled in the art should appreciate that other designs are possible, including, but not limited to a tack material, a hook and loop fastener, magnet, or protruding member that is applied thereof to provide added friction.

As shown in FIGS. 1-6, the second actuation body 44 extends away from an edge surface of the second grip body 38, about an approximate middle portion thereof. However, one skilled in the art should appreciate that the second actuation body 44 may be disposed at various positions along the second grip body 38. In an exemplary embodiment, the second actuation body 44 extends away from a bottom surface edge 46 at an angle, away from the second grip surface 40. The second actuation body 44 may also include a fastener grip 58 for accommodating a firm grasp by a user. As shown, the fastener grip 58 may include a plurality of protrusions 60 extending out and away from the second actuation body 44 surface. One skilled in the art should appreciate that other designs are possible, including, but not limited to tack material, physical depressions, or other known mechanically attached pieces.

As shown in FIGS. 1-3, the second attachment tabs 52 are disposed on an inner surface of the second actuation body 44. Also, as shown, the second attachment tabs 52 are positioned proximate to a connection section 54 between the second actuation body 44 and the second grip body 38. As clearly shown in FIG. 3, the second attachment tabs 52 includes three second attachment tabs 52, with a pair of second attachment tabs 52 positioned along one side of the second actuation body 44, and another second attachment tab 52 positioned on an opposing other side of the second actuation body 44. The distance between the pair of second attachment tabs 52 is made less than the distance between the other second attachment tab 52 and the closer second attachment tab 52 of the pair of second attachment tabs 52. In the shown embodiment, the distance between the pair of second attachment tabs 52 is slightly larger than a thickness of the first attachment tabs 22. One skilled in the art should appreciate that other designs are possible. For instance, it is possible that the second fastener body 34 includes more or less second attachment tabs 52 than shown.

Also shown in FIGS. 1-3, the third attachment tabs 62 are disposed on an outer surface of the second actuation body 44. Also, as shown, the third attachment tabs 62 are positioned proximate to a connection section 54 between the second actuation body 44 and the second grip body 38. As clearly shown in FIG. 3, the second attachment tabs 52 includes a pair of third attachment tabs 62, with each attachment tab 62 positioned along opposite sides of the second actuation body 44. One skilled in the art should appreciate that other designs are possible. For instance, it is possible that the second fastener body 34 includes more or less second attachment tabs 62 than shown.

As shown, each second and third attachment tab 52, 62 includes a pin receiving passageway 64 positioned on an end portion thereof, in the exemplary embodiment.

As shown in FIGS. 2, 3, 5 and 6, the first attachment mechanism 66 includes a first pin 68 and a first torsional spring 76.

The first pin 68 may be made of a plastic or metal material, and has coil body 70 with a diameter approximately equal or less than a diameter of the pin receiving passageways 32, 64. In the shown embodiment, the first pin 68 includes enlarged end sections 74 having an outer diameter larger than an outer diameter of the coil body 70.

The first torsional spring 76 is spring made of metal wire or any other suitable spring material capable of applying a force. The first torsional spring 76 includes a coil section 78 and a pair of pressing sections 80. The coil section 78 includes a pin receiving section 72 sized to receive the first pin 68. In the shown embodiment, the pressing sections 80 are opposite ends of the metal wire that extend from the opposite ends of the coil section 78. Each pressing section 80 extends from the coil section 78 at an angle and away from the other pressing section 80.

Now with reference to FIGS. 1-6, the third fastener body 82 is shown and includes a third grip body 84 with a third grip surface 86 and a third outer surface 88 opposite the third grip surface 86, a third actuation body 90, a plurality of fasteners 94, and a plurality of fourth attachment tabs 96.

The third fastener body 82 can be made of a plastic, a metal, other material known to one skilled in that art, or a combination of materials thereof.

As shown in FIGS. 1-3, the third grip body 84 is substantially rectangular planar member, although other polygonal shapes, such as a square, triangle, or circle, may also be used. The third grip body 84 is solid, but could also be hollow or include one or more perforations extending there through. As more clearly shown in FIG. 4, the third grip body 84 is curved such that the third outer surface 88 is convex and the third grip surface 86 is concave. In the shown embodiment, the third grip body 84 is curved with respect to a vertical plane extending through the dress clip 1.

Accordingly, the shown third grip body 84 also has a negative meniscus shape. However, one skilled in the art should appreciate that the second grip body 38 could have known shapes, such as biconvex, plano convex, positive meniscus, plano concave, or bio concave. In another embodiment, it is possible that the first body is a flat planar member not having any curve to its shape.

As shown in FIGS. 2-6, the plurality of fasteners 94 are disposed along the third grip surface 86. In an exemplary embodiment, each fastener 94 is an elongated protuberance extending vertically to opposite ends of the third grip body 84. One skilled in the art should appreciate that other designs are possible, including, but not limited to a tack material, a hook and loop fastener, magnet, or protruding member that is applied thereof to provide added friction.

As shown in FIGS. 1-6, the third actuation body 90 extends away from an edge surface of the third grip body 84, about an approximate middle portion thereof. However, one skilled in the art should appreciate that the third actuation body 90 may be disposed at various positions along the third grip body 84. In an exemplary embodiment, the third actuation body 90 extends away from a bottom surface edge 92 at an angle, away from the third grip surface 86. The third actuation body 90 may also include a grip 102 for accommodating a firm grasp by a user. As shown, the grip 102 may include a single protrusion 104 along a distal end of the third actuation body 90 with respect to the third grip body 84. Once skilled in the art should appreciate that other designs are possible, including, but not limited to tack material, physical depressions, or other known mechanically attached pieces.

As shown in FIGS. 1-3, the fourth attachment tabs 96 are disposed along the third grip surface 86. Also, as shown, the fourth attachment tabs 96 are positioned proximate to a connection section 98 between the third actuation body 90 and the third grip body 84. As clearly shown in FIG. 2, the fourth attachment tabs 96 includes a pair of second attachment tabs 52 positioned on opposite side of the third grip surface 86. One skilled in the art should appreciate that other designs are possible. For instance, it is possible that the third fastener body 82 includes more or less fourth attachment tabs 96 than shown.

As shown, each fourth attachment tabs 96 includes a pin receiving passageway 100 positioned on an end portion there that is distal with respect to the connection section 98, in the exemplary embodiment.

As shown in FIGS. 2, 3, 4 and 6, the second attachment mechanism 106 includes a second pin 108 and a second torsional spring 114.

The second pin 108 may be made of a plastic or metal material, and has coil body 110 with a diameter approximately equal or less than a diameter of the pin receiving passageways 64, 100. In the shown embodiment, the second pin 108 includes enlarged end sections 112 having an outer diameter larger than a outer diameter of the coil body 110.

The second torsional spring 114 is spring made of metal wire or any other suitable spring material capable of applying a force. The second torsional spring 114 includes a coil section 116 and a pair of pressing sections 120. The coil section 116 includes a pin receiving section 118 sized to receive the second pin 108. In the shown embodiment, the pressing sections 120 are opposite ends of the metal wire that extend from the opposite ends of the coil section 116. Each pressing section 120 extends from the coil section 116 at an angle and away from the other pressing section 120.

Now with reference to FIGS. 1-6, assembly of the major components of the dress clip 1 will now be described in detail.

The first clip 2 is provided when the first fastener body 10 face and connects to the second fastener body 34 using the first pin 68 and the first torsional spring 76. The second clip 4 is provided when the second fastener body 34 faces and connects and the third fastener body 82 using the second pin 108 and the second torsional spring 114.

In the first clip 2, the first fastener body 10 is connected to the second fastener body 34 through using the first attachment mechanism 66 that connects the first attachment tabs 22 and the second attachment tabs 52. The first attachment tabs 22 and the second attachment tabs 52 are aligned with each other such that the pin receiving passageways 32, 64 correspond with each other. The first torsional spring 76 is positioned between the pin receiving passageways 32, 64 and the first pin 68 is positioned through extends through the first and second pin receiving passageways 32, 64. The first torsional spring 76 is positioned with the coil body 70 to hingedly connect the first fastener body 10 to the second fastener body 34.

The first torsional spring 76 is positioned on an approximate central portion of the first pin 68 and biased against the first actuation body 18 and the second actuation body 44 to push the first actuation body 18 and the second actuation body 44 away from each other. This forces the first grip body 12 and the second grip body 38 together. When a force greater than the biasing force is placed on the first actuation body 18 and second actuation body 44, the first actuation body 18 and the second actuation body 44 can be squeezed together, resulting in the first grip body 12 and the second grip body 38 to be spread apart to insert the fabric from a clothing article (not shown) to be placed in between the first grip body 12 and the second grip body 38. The fasteners 20, 48 grip the fabric.

In a similar manner to that of the first clip 2, the second fastener body 34 is connected to the third fastener body 82 through using the second attachment mechanism 106 that connects the third attachment tabs 62 and the fourth attachment tabs 96. The third attachment tabs 62 and the fourth attachment tabs 96 are aligned with each other such that the pin receiving passageways 64, 100 correspond with each other. The second torsional spring 114 is positioned between the pin receiving passageways 64, 100 and the second pin 108 is positioned through extends through the pin receiving passageways 64, 100. The second torsional spring 114 is positioned with the coil body 110 to hingedly connect the second fastener body 34 to the third fastener body 82.

The second torsional spring 114 is positioned on an approximate central portion of the second pin 108 and biased against the second actuation body 44 and the third actuation body 90 to push the second actuation body 44 and the third actuation body 90 away from each other. As shown, the second actuation body 44 and the third actuation body 90 are diagonally positioned from each other with respect to the second attachment mechanism 106. This forces the second actuation body 44 and the third grip body 84 together. When a force greater than the biasing force is placed on the first grip body 12 and the third actuation body 90, the second actuation body 44 and the third grip body 84 may be spread apart to insert the fabric from a clothing article (not shown) to be placed in between the second actuation body 44 and the third grip body 84. The fastener grip 58 and the fastener 94 can grip the fabric.

As can be seen in FIGS. 1-6, the first clip 2 and the second clip 4 are oriented in opposing directions, such that the gripping function of the first clip 2 is on a first side, whereas the gripping function of the second clip 4 is on an opposing second side of the dress clip 1.

Another dress clip 200 according to the invention is shown in FIGS. 7-11. The dress clip 200 according to the invention is shown with the following major components: a first clip 202 and a second clip 204.

The first clip 202 includes a first fastener body 210, a second fastener body 234, and a first attachment mechanism 266. The second clip 204 includes the second fastener body 234, a third fastener body 282, and a second attachment mechanism 306.

As shown in FIGS. 7-11, the first fastener body 210 includes a first grip body 212 with a first outer surface 214 and a first grip surface 216 opposite the first outer surface 214, and a plurality of first attachment tabs 222.

The first fastener body 210 can be made of a plastic, a metal, other material known to one skilled in that art, or a combination of materials thereof.

As shown in FIGS. 7-11, the first grip body 212 is substantially rectangular planar member, although other polygonal shapes, such as a square, triangle, or circle, may also be used. The first grip body 212 is solid, but could also be hollow or include one or more perforations extending there through. As more clearly shown in FIG. 7, the first grip body 212 is flat, but could be curved as is shown in the dress clip 200.

As shown, the first attachment tabs 222 are disposed on a lower surface of the first grip body 212. Also, as shown, the first attachment tabs 222 are positioned proximate to a center of the edge thereof. As clearly shown in FIGS. 7 and 8, the first attachment tabs 222 includes three first attachment tabs 222, with a pair of first attachment tabs 222 positioned on one side of the first grip body 212, and another first attachment tab 222 positioned on an opposing other side of the first grip body 212. The distance between the pair of first attachment tabs 222 is made less than the distance between the other first attachment tab 222 and the closer first attachment tab 222 of the pair of first attachment tabs 222. In the shown embodiment, the distance between the pair of first attachment tabs 222 is slight larger than a thickness of the first attachment tabs 222. One skilled in the art should appreciate that other designs are possible. For instance, it is possible that the first fastener body 210 includes more or less first attachment tabs 222 than shown.

As shown, each first attachment tab 222 includes a pin receiving passageway 32 positioned on an end portion distal, in the exemplary embodiment.

Additionally, the first grip body 212 includes a first pin fastener section 224 position along the first outer surface 214 thereof. The first pin fastener section 224 is a groove extend from the first outer surface 214 and extending into the first grip body 212. However, one skilled in the art should appreciate that other design are possible. For instance, the first pin fastener section 224 may include a flat planar surface have a pair of retention pieces (i.e. protrusions) positioned parallel to each other and extending above the first outer surface 214. In another embodiment, the first pin fastener section 224 may be a fastener, such as clip, hook and loop fastener, screw, nut and bolt, etc.

As shown in FIGS. 7-11, the second fastener body 234 includes a second grip body 236 with a second outer surface 242 and a second grip surface 240 opposite the second outer surface 242, a plurality of second attachment tabs 252, and plurality of third attachment tabs 262.

The second fastener body 234 can be made of a plastic, a metal, other material known to one skilled in that art, or a combination of materials thereof.

As shown in FIGS. 7-11, the second grip body 236 is substantially rectangular planar member, although other polygonal shapes, such as a square, triangle, or circle, may also be used. The second grip body 236 is solid, but could also be hollow or include one or more perforations extending there through. As more clearly shown in FIG. 7, the second grip body 236 is flat, but could be curved as is shown in the dress clip 1. The second grip body 236 is designed to correspond with the shape of the second grip body 236.

As shown, the second attachment tabs 252 are disposed on a lower surface of the second grip body 236. Also, as shown, the second attachment tabs 252 are positioned proximate to a center of the edge thereof. As clearly shown in FIGS. 7 and 8, the second attachment tabs 252 includes three second attachment tabs 252, with a pair of second attachment tabs 252 positioned on one side of the second grip body 236, and another second attachment tab 252 positioned on an opposing other side of the second grip body 236. The distance between the pair of second attachment tabs 252 is made less than the distance between the other second attachment tab 252 and the closer second attachment tab 252 of the pair of second attachment tabs 252. In the shown embodiment, the distance between the pair of second attachment tabs 252 is slight larger than a thickness of the second attachment tabs 252. One skilled in the art should appreciate that other designs are possible. For instance, it is possible that the second fastener body 234 includes more or less second attachment tabs 252 than shown.

As shown, each second attachment tab 252 includes a pin receiving passageway 264 positioned on an end portion distal, in the exemplary embodiment.

Additionally, the second grip body 236 includes a second pin fastener section 256 position along the first outer surface 214 thereof. The first pin fastener section 224 is a groove extend from the first outer surface 214 and extending into the first grip body 212. However, one skilled in the art should appreciate that other design are possible. For instance, the first pin fastener section 224 may include a flat planar surface have a pair of retention pieces (i.e. protrusions) positioned parallel to each other and extending above the first outer surface 214. In another embodiment, the first pin fastener section 224 may be a fastener, such as clip, hook and loop fastener, screw, nut and bolt, etc.

Figure 11:
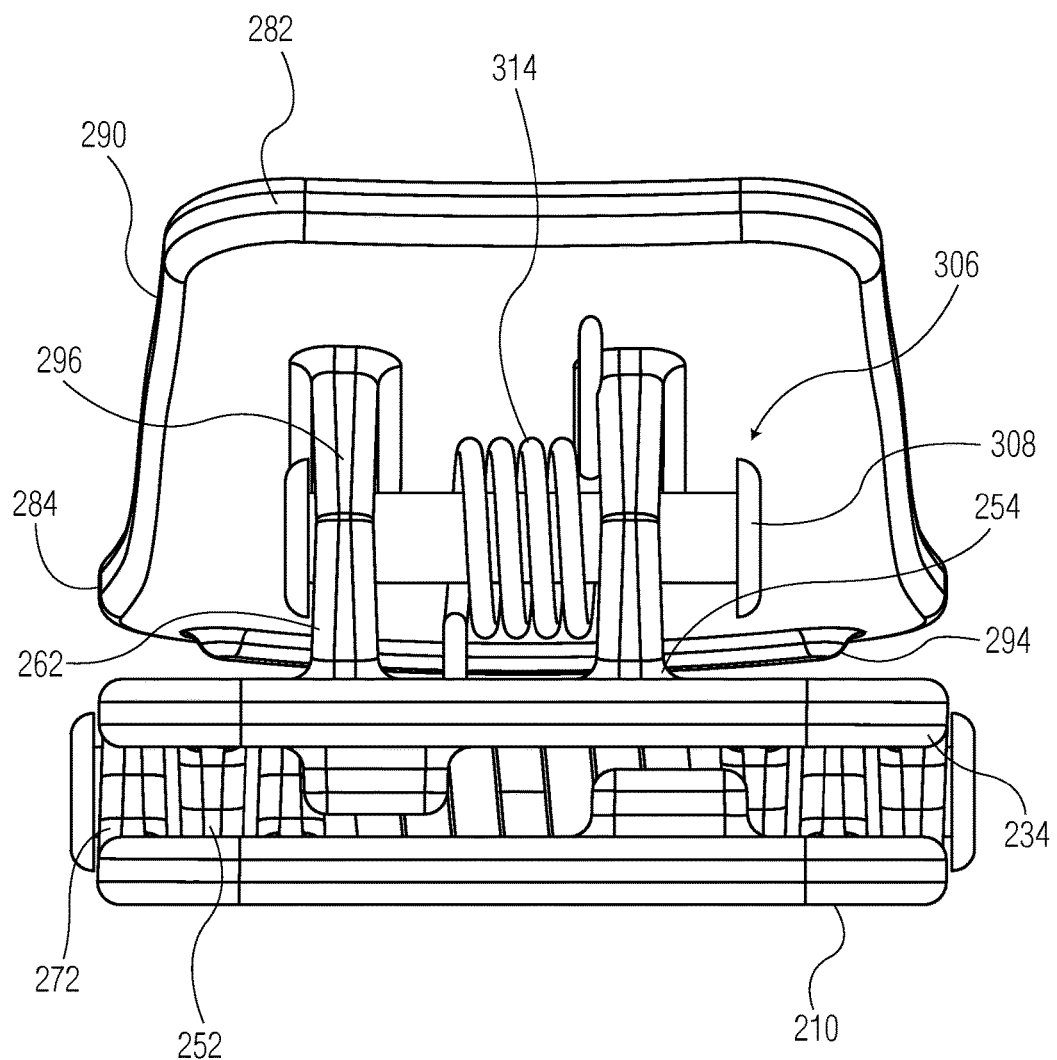
FIG. 11 is a top view of the dress clip of FIG. 7.
Figure 12:
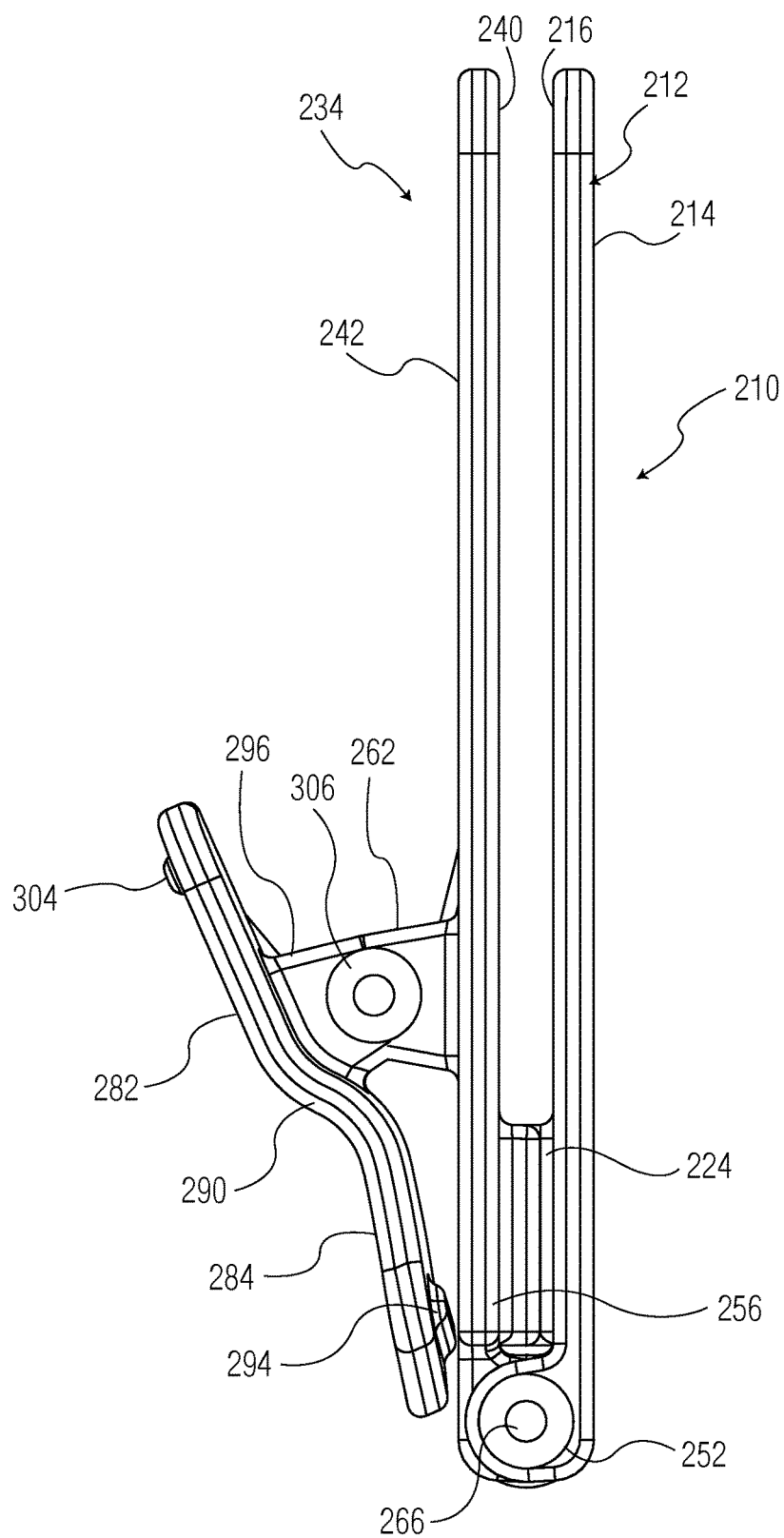
FIG. 12 is a side view of the dress clip of FIG. 7.

Also shown in FIGS. 11 and 12, the third attachment tabs 262 are disposed on an outer surface of the second grip body 236. Also, as shown, the third attachment tabs 262 are positioned proximate to a middle section 254 of the second grip body 236, along the second outer surface 242. One skilled in the art should appreciate that other designs are possible. For instance, it is possible that the second fastener body 234 includes more or less second attachment tabs 252 than shown.

As shown, each second and third attachment tab 252, 262 includes a pin receiving passageway 264 positioned on an end portion thereof, in the exemplary embodiment.

As shown the FIGS. 7-11, the first attachment mechanism 266 includes a first pin 268 and a first torsional spring 276.

The first pin 268 may be made of a plastic or metal material, and has coil body 270 with a diameter approximately equal or less than a diameter of the pin receiving passageways 232, 264. In the shown embodiment, the first pin 268 includes enlarged end sections 274 having an outer diameter larger than a outer diameter of the coil body 270.

The first torsional spring 276 is spring made of metal wire or any other suitable spring material capable of applying a force. The first torsional spring 276 includes a coil section 278 and a pair of pressing sections 280. The coil section 278 includes a pin receiving section 281 sized to receive the first pin 268. In the shown embodiment, the pressing sections 280 are opposite ends of the metal wire that extend from the opposite ends of the coil section 278. Each pressing section 280 extends from the coil section 278 parallel with respect to the other pressing section 280.

Now with reference to FIGS. 7-12, the third fastener body 282 is shown and includes a third grip body 284 with a third grip surface 286 and a third outer surface 288 opposite the third grip surface 286, a third actuation body 290, a plurality of fasteners 294, and a plurality of fourth attachment tabs 296.

The third fastener body 282 can be made of a plastic, a metal, other material known to one skilled in that art, or a combination of materials thereof.

As shown, the third grip body 284 is substantially rectangular planar member, although other polygonal shapes, such as a square, triangle, or circle, may also be used. The third grip body 284 is solid, but could also be hollow or include one or more perforations extending there through. As more clearly shown in FIGS. 10-12, the third grip body 284 is curved such that the third outer surface 288 is convex and the third grip surface 286 is concave. In the shown embodiment, the third grip body 284 is curved with respect to a vertical plane extending through the dress clip 200.

Accordingly, the shown third grip body 284 also has a negative meniscus shape. However, one skilled in the art should appreciate that the second grip body 236 could have known shapes, such as biconvex, plano convex, positive meniscus, plano concave, or bio concave. In another embodiment, it is possible that the first body is a flat planar member not having any curve to its shape.

As shown, the plurality of fasteners 294 are disposed along the third grip surface 286. In an exemplary embodiment, each fastener 294 is an elongated protuberance extending vertically to opposite ends of the third grip body 284. One skilled in the art should appreciate that other designs are possible, including, but not limited to a tack material, a hook and loop fastener, magnet, or protruding member that is applied thereof to provide added friction.

As shown, the third actuation body 290 extends away from an edge surface of the third grip body 284, about an approximate middle portion thereof. However, one skilled in the art should appreciate that the third actuation body 290 may be disposed at various positions along the third grip body 284. In an exemplary embodiment, the third actuation body 290 extends away from a bottom surface edge 292 at an angle, away from the third grip surface 286. The third actuation body 290 may also include a grip 302 for accommodating a firm grasp by a user. As shown, the grip 302 may include a single protrusions 304 along a distal end of the third actuation body 290 with respect to the third grip body 284. Once skilled in the art should appreciate that other designs are possible, including, but not limited to tack material, physical depressions, or other known mechanically attached pieces.

Figure 8:
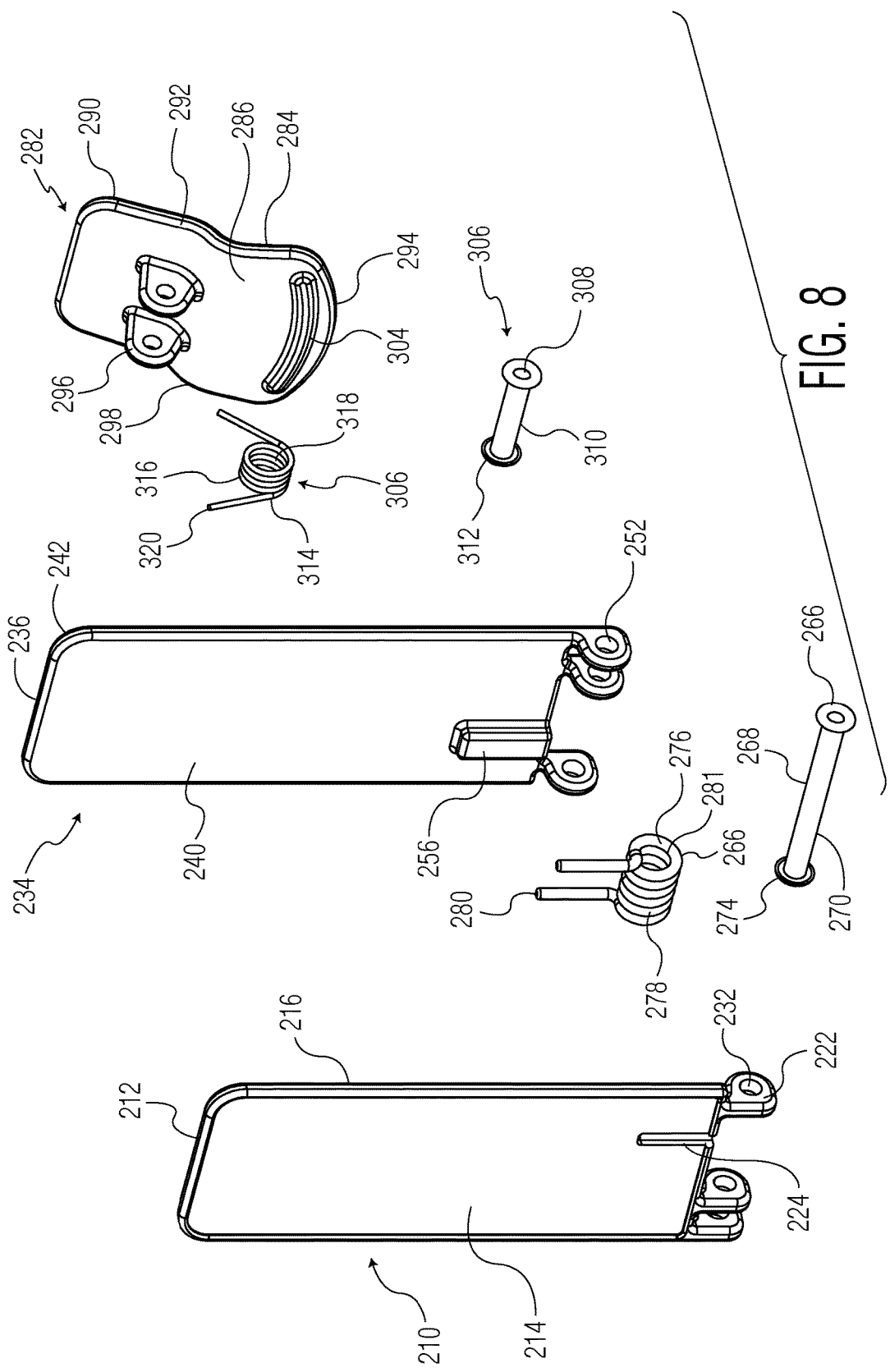
FIG. 8 is an exploded view of the dress clip of FIG. 7.
Figure 9:
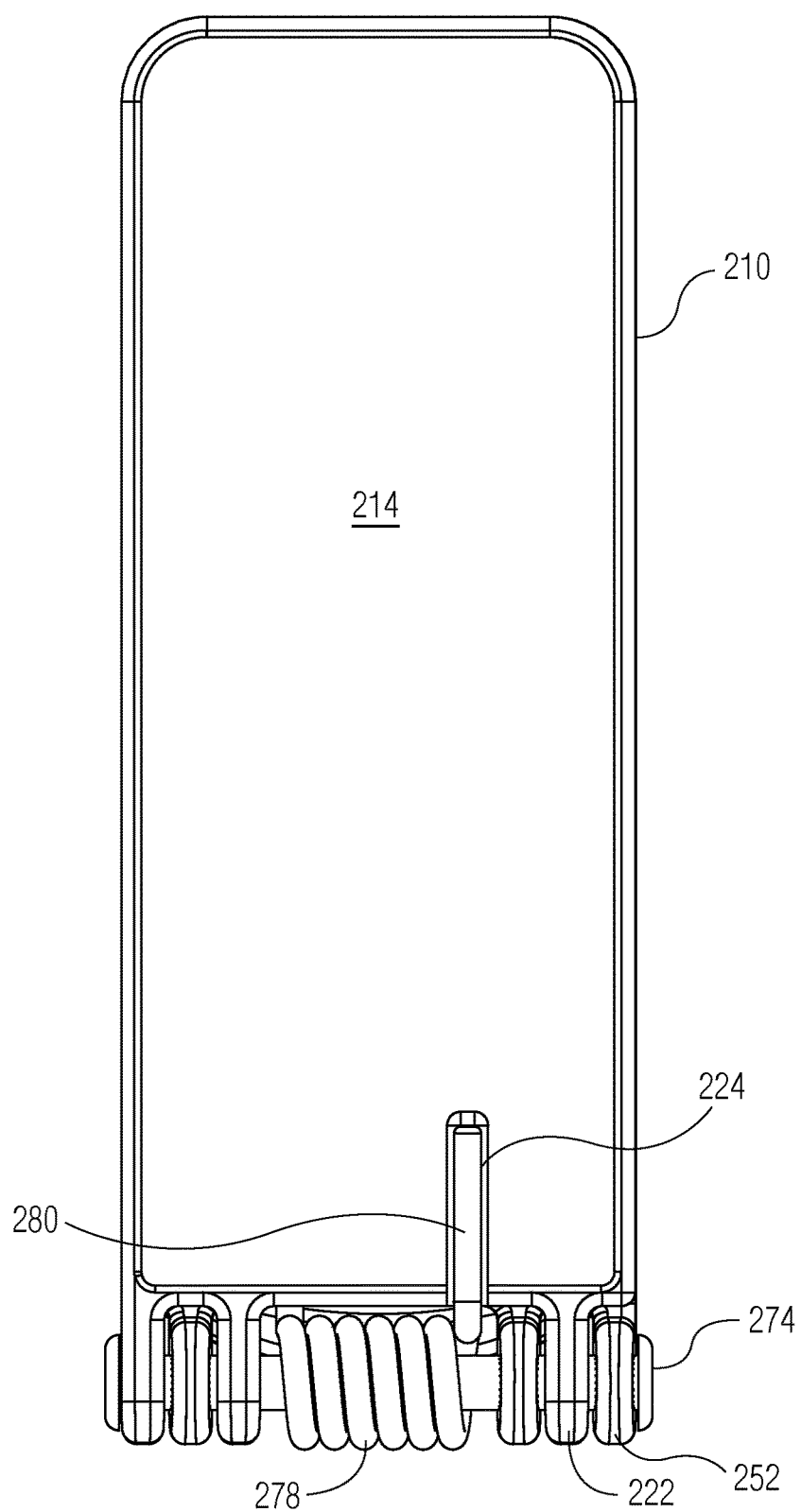
FIG. 9 is a front view of the dress clip of FIG. 7.
Figure 10:
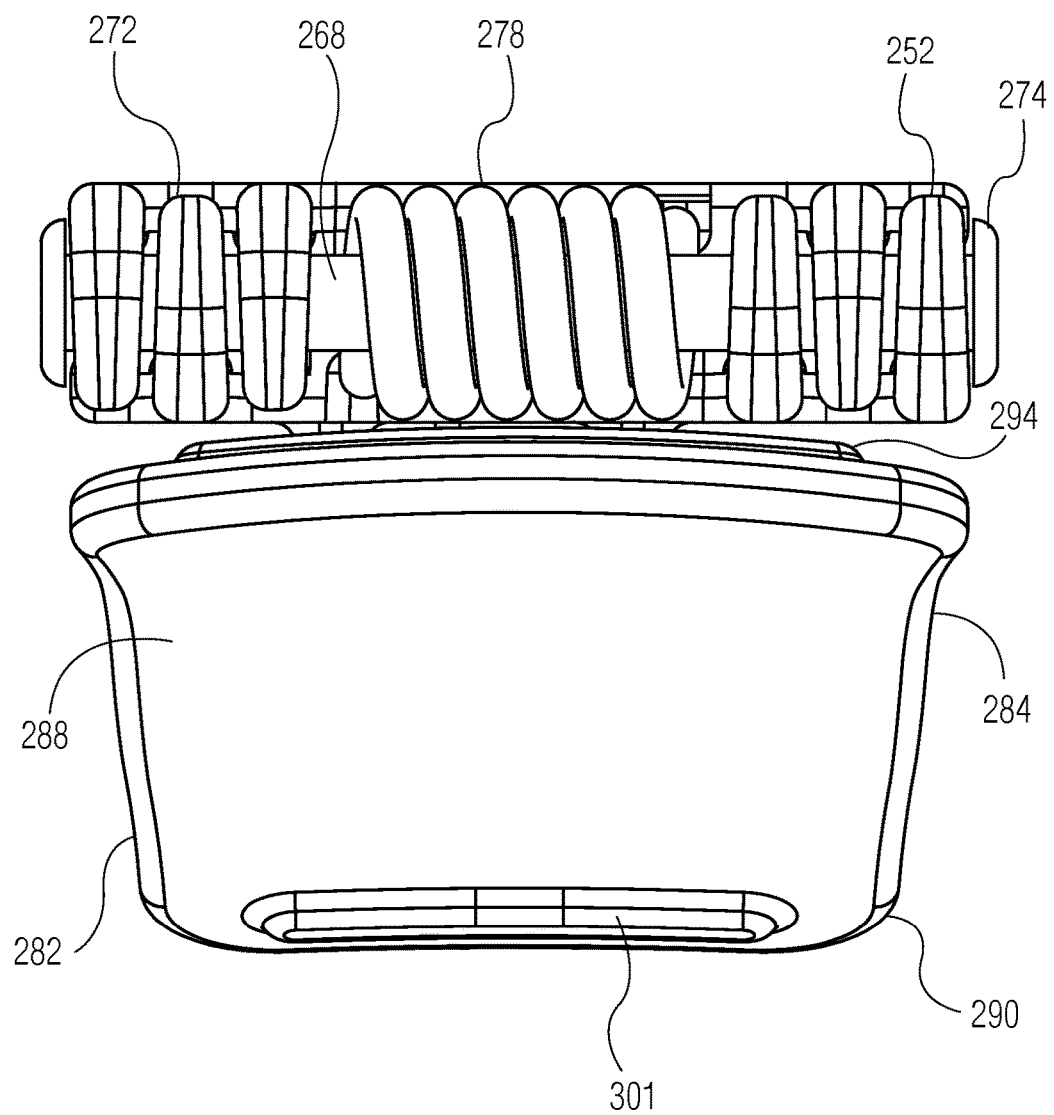
FIG. 10 is a bottom view of the dress clip of FIG. 7.

As shown in FIGS. 8, 11, and 12, the fourth attachment tabs 296 are disposed along the third grip surface 286. Also, as shown, the fourth attachment tabs 296 are positioned proximate to a connection section 298 between the third actuation body 290 and the third grip body 284. As clearly shown in FIG. 12, the fourth attachment tabs 296 includes a pair of second attachment tabs 252 positioned on opposite side of the third grip surface 286. One skilled in the art should appreciate that other designs are possible. For instance, it is possible that the third fastener body 282 includes more or less fourth attachment tabs 296 than shown.

As shown, each fourth attachment tabs 296 includes a pin receiving passageway 300 positioned on an end portion there that is distal with respect to the connection section 298, in the exemplary embodiment.

As shown in FIGS. 7-12, the second attachment mechanism 306 includes a second pin 308 and a second torsional spring 314.

The second pin 308 may be made of a plastic or metal material, and has coil body 310 with a diameter approximately equal or less than a diameter of the pin receiving passageways 264, 300. In the shown embodiment, the second pin 308 includes enlarged end sections 312 having an outer diameter larger than a outer diameter of the coil body 310.

The second torsional spring 314 is spring made of metal wire or any other suitable spring material capable of applying a force. The second torsional spring 314 includes a coil section 316 and a pair of pressing sections 320. The coil section 316 includes a pin receiving section 318 sized to receive the second pin 308. In the shown embodiment, the pressing sections 320 are opposite ends of the metal wire that extend from the opposite ends of the coil section 316. Each pressing section 320 extends from the coil section 316 at an angle and away from the other pressing section 320.

Now with reference to FIGS. 7-12, assembly of the major components of the dress clip 200 will now be described in detail.

The first clip 202 is provided when the first fastener body 210 is positioned facing and connects to the second fastener body 234 using the first pin 268 and the first torsional spring 276. The second clip 204 is provided when the second fastener body 234 faces and connects and the third fastener body 282 using the second pin 308 and the second torsional spring 314.

In the first clip 202, the first fastener body 210 is connected to the second fastener body 234 through using the first attachment mechanism 266 that connects the first attachment tabs 222 and the second attachment tabs 252. The first attachment tabs 222 and the second attachment tabs 252 are aligned with each other such that the pin receiving passageways 232, 264 correspond with each other. The first torsional spring 276 is positioned between the pin receiving passageways 232, 264 and the first pin 268 is positioned through extends through the first and second pin receiving passageways 232, 264. The first torsional spring 276 is positioned with the coil body 270 to hingedly connect the first fastener body 210 to the second fastener body 234.

The pressing sections 280 are positioned in the first and second pin fastener sections 224, 256 such that the pressing sections 280 rest bias against the first grip body 212 and the second grip body 236 to force the first grip body 212 and the second grip body 236 together. When a force greater than the biasing force is placed on the first grip body 212 and the second grip body 236, the first grip body 212 and the second grip body 236 to be spread apart to insert the fabric from a clothing article (not shown) to be placed in between the first grip body 212 and the second grip body 236. The first grip body 212 and the second grip body 236 grip the fabric.

In a similar manner to that of the first clip 202, the second fastener body 234 is connected to the third fastener body 282 through using the second attachment mechanism 306 that connects the third attachment tabs 262 and the fourth attachment tabs 296. The third attachment tabs 262 and the fourth attachment tabs 296 are aligned with each other such that the pin receiving passageways 264, 300 correspond with each other. The second torsional spring 314 is positioned between the pin receiving passageways 264, 300 and the second pin 308 is positioned through extends through the pin receiving passageways 264, 300. The second torsional spring 314 is positioned with the coil body 310 to hingedly connect the second fastener body 234 to the third fastener body 282.

The second torsional spring 314 is positioned on an approximate central portion of the second pin 308 and biased against the second grip body 236 and the third actuation body 290 to push the second grip body 236 and the third actuation body 290 away from each other. As shown, the second grip body 236 and the third actuation body 290 are diagonally positioned from each other with respect to the second attachment mechanism 306. This forces the second grip body 236 and the third grip body 284 together. When a force greater than the biasing force is placed on the second grip body 236 and the third actuation body 290, the second grip body 236 and the third grip body 284 may be spread apart to insert the fabric from a clothing article (not shown) to be placed in between the second grip body 236 and the third grip body 284. The second grip body 236 and the fastener 294 can grip the fabric.

As can be seen in FIGS. 7-12, the first clip 202 and the second clip 204 are oriented in opposing directions, such that the gripping function of the first clip 202 is on a first side, whereas the gripping function of the second clip 204 is on an opposing second side of the dress clip 200.

While the invention has been described in detail and with reference to specific embodiments, one of ordinary skill in the art would appreciate that the described embodiments are illustrative, and that various changes and modifications can be made without departing from the scope of the invention.

What is claimed is:

1. A dress clip comprising:
a first fastener body with a first surface and an opposing second surface, the first fastener body having:
  a first body,
  a first actuation body positioned on an approximate middle edge portion of the first body, and
  a plurality of first attachment tabs disposed on the first actuation body along the opposing second surface and having first pin receiving passageways;
a second fastener body with a third surface and an opposing fourth surface, the second fastener body having:
  a second body,
  a second actuation body positioned on an approximate middle edge portion of the second body,
  a plurality of second attachment tabs disposed on the second actuation body along the third surface and having second pin receiving passageways, and
  a plurality of third attachment tabs disposed on the second actuation body along the opposing fourth surface and having third pin receiving passageways;
a first pin extending through the first and second pin receiving passageways to hingedly connect the first fastener body to the second fastener body;
a first torsional spring positioned on the first pin and biased against the opposing second surface and the third surface to push the first actuation body and the second actuation body away from each other;
a third fastener body with a fifth surface and an opposing sixth surface, the third fastener body having:
  a third body,
  a third actuation body extending from an edge of the third body,
  a plurality of fourth attachment tabs disposed on the third actuation body along the fifth surface and having fourth pin receiving passageways;
a second pin extending through the third and fourth pin receiving passageways to hingedly connect the second fastener body to the third fastener body; and
a second torsional spring positioned on the second pin member and biased against the opposing fourth surface and the fifth surface to push the second actuation body and the third actuation body away from each other.

2. The dress clip of claim 1, wherein the first actuation body extends away from the third surface and the second actuation body.

3. The dress clip of claim 2, wherein the second actuation body extends away from the second surface and the first actuation body.

4. The dress clip of claim 3, wherein the third actuation body extends away from the fourth surface.

5. The dress clip of claim 1, wherein the first torsional spring biases the second surface of the first body against the third surface of the second body, and biases the third surface of the second body against the second surface of the first body.

6. The dress clip of claim 5, wherein the second torsional spring biases the fourth surface of the second actuation body against the fifth surface of the third body, and biases the fifth surface of the third body against the fourth surface of the second actuation body.

7. The dress clip of claim 1, wherein the first body is bowed such that the second surface is concave.

8. The dress clip of claim 7, wherein the second body is bowed such that the third surface is convex.

9. The dress clip of claim 8, wherein a degree of bowing of the first body is complementary to a degree of bowing of the second body.

10. The dress clip of claim 1, wherein the first fastener body, the second fastener body, the first pin, and the first torsional spring, taken together form a first dress clip assembly.

11. The dress clip of claim 1, wherein the second fastener body, the third fastener body, the second pin, and the second torsional spring, taken together form a second dress clip assembly.

12. The dress clip of claim 1, further comprising a gripping material disposed on the second surface of the first body, the third surface of the second body, the fourth surface of the second actuation body, the fifth surface of the third body, or a combination thereof.

13. The dress clip of claim 12, wherein the gripping material is a rubber, synthetic rubber, silicone polymer, or any other suitable synthetic polymer having a surface friction sufficient to grip fabric.

14. A dress clip comprising:
a first fastener body with a first surface and an opposing second surface and having a first body and a plurality of first attachment tabs extending from a first longitudinal end of the first body and having first pin receiving passageways;
a second fastener body with a third surface and an opposing fourth surface, the second fastener body having:
  a second body,
  a plurality of second attachment tabs extending from a first longitudinal end of the second body and having second pin receiving passageways, and
  a plurality of third attachment tabs disposed on the second body at a distance from the first longitudinal end of the second body and having third pin receiving passageways;

a first pin extending through the first and second pin receiving passageways to hingedly connect the first fastener body to the second fastener body;

a first torsional spring positioned on the first pin and biased against the first fastener body along the first surface and the second fastener body along the fourth surface to push the first fastener body and the second fastener body towards each other;

a third fastener body with a fifth surface and an opposing sixth surface, the third fastener body having:

a third body, an actuation body extending from an end of the third body in an outward direction away from the fourth surface, and a plurality of fourth attachment tabs disposed on the third actuation body along the first surface and having fourth pin receiving passageways;

a second pin extending through the third and fourth pin receiving passageways to hingedly connect the second fastener body to the third fastener body; and a second torsional spring positioned on the second pin member and biased against the second fastener body along the fourth surface and the actuation body along the fifth surface to push the second fastener body and the actuation body of the third fastener body away from each other.

\* \* \* \* \*